UNITED STATES PATENT OFFICE.

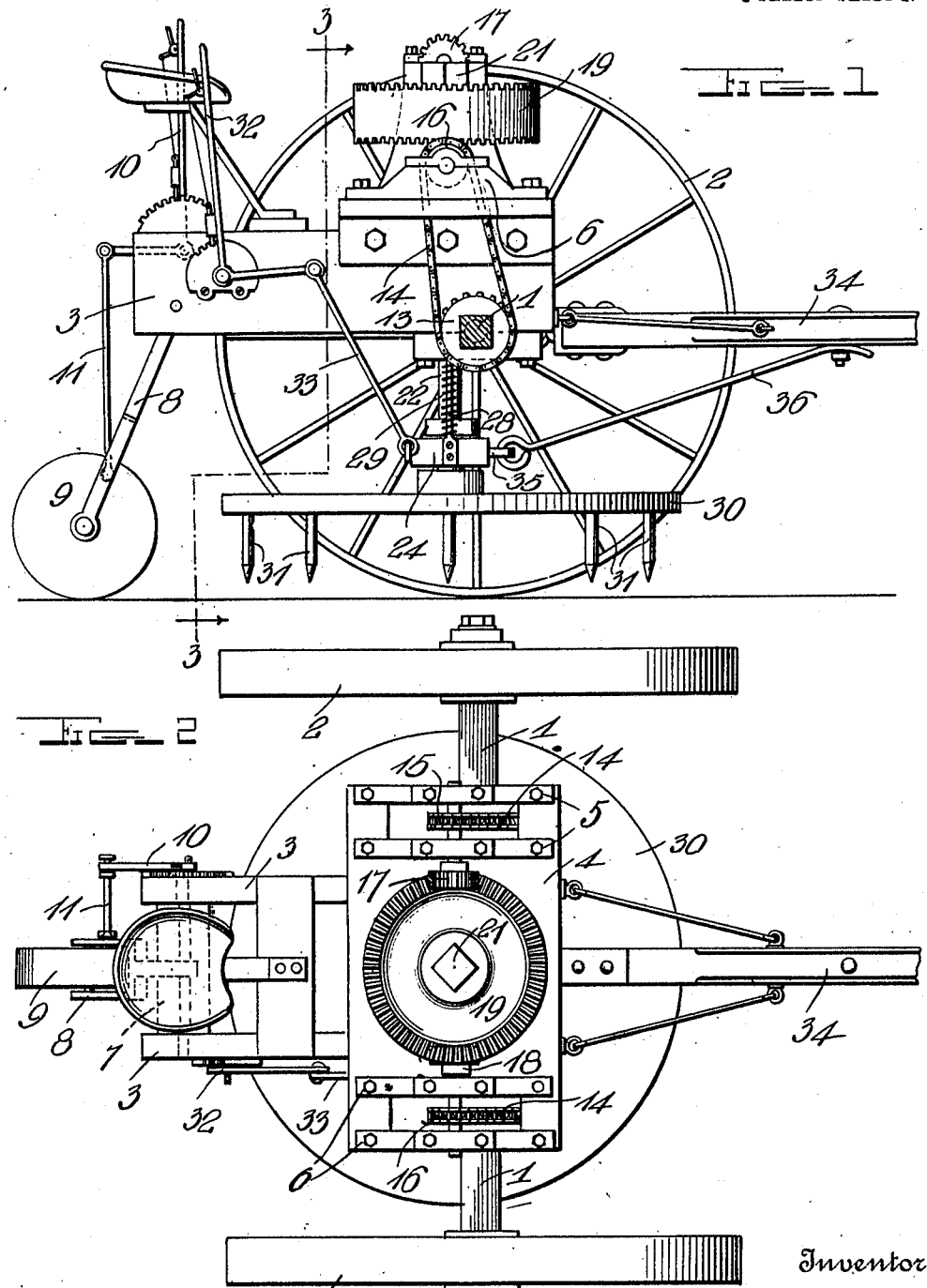

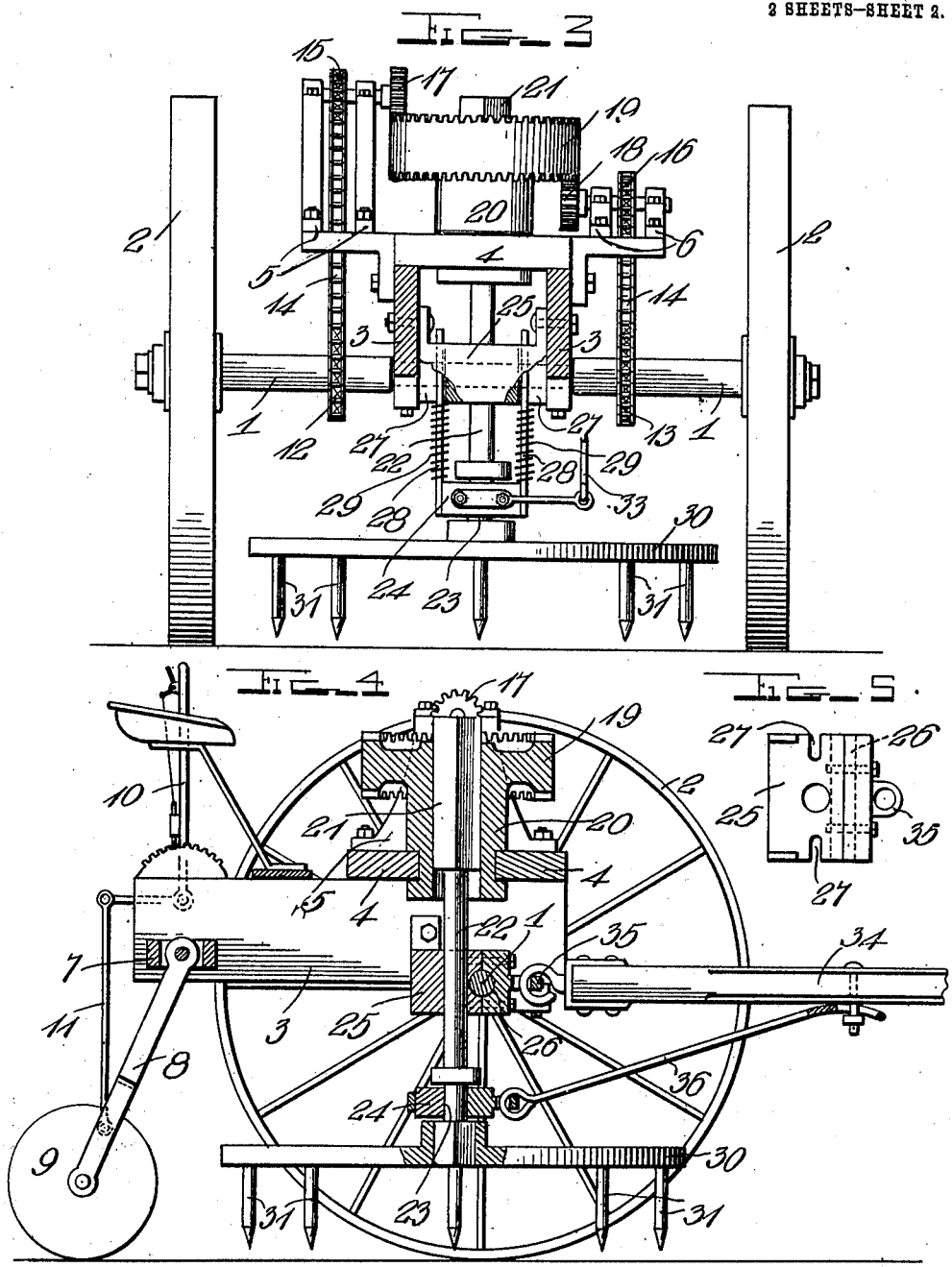

THOMAS RICHARDS, OF NEW HARMONY, INDIANA, ASSIGNOR OF ONE-HALF TO HORACE P. OWEN, OF NEW HARMONY, INDIANA.

ROTARY HARROW.

993,197. Specification of Letters Patent. Patented May 23, 1911.

Application filed December 5, 1910. Serial No. 595,695.

*To all whom it may concern:*

Be it known that I, THOMAS RICHARDS, a citizen of the United States, residing at New Harmony, in the county of Posey and State of Indiana, have invented certain new and useful Improvements in Rotary Harrows; and I do declare the following to be a full, clear, and exact description of the invention, such as will enable others skilled in the art to which it appertains to make and use the same.

This invention relates to improvements in harrows and has for its object the provision of a harrow which will be positively rotated as it is drawn over the ground so that the soil will be thoroughly pulverized and in which the driving mechanism will be so disposed as to effectually prevent bending or twisting of the harrow carrying shaft.

A further object of the invention is to provide novel means whereby the harrow may be adjusted to cut more or less into the ground and the harrow frame regulated so as to be maintained in a horizontal position.

A further object of the invention is to provide novel means for relieving the strain upon the draft tongue.

These stated objects, and other minor objects which will hereinafter appear, are attained in the use of the mechanism illustrated in the accompanying drawings and the invention consists in certain novel features of the same which will be hereinafter first fully described and then more particularly pointed out in the appended claims.

In the drawings:—Figure 1 is a side elevation, with the rear carrying wheel removed, of a harrow constructed in accordance with my present invention; Fig. 2 is a plan view; Fig. 3 is a transverse vertical section on the line 3—3 of Fig. 1; Fig. 4 is a central longitudinal section; and Fig. 5 is a detail plan view of the guide for the harrow carrying shaft.

In carrying out my invention, I employ an axle or driving shaft 1 to the ends of which are rigidly secured carrying wheels 2 which may be of any desired construction. The axle or driving shaft is journaled in the side bars 3 of a supporting frame which is completed by a platform or cross bar 4 secured upon the side bars 3 and bearings or brackets 5 and 6 at the ends of the said platform or cross bar. Between the rear ends of the side bars 3, I pivotally mount a bracket or yoke 7 in which is hung a fork 8 carrying a trailing wheel 9. A lever 10 fulcrumed upon one of the side bars 3 is connected by a link 11 to the fork 8 so that by swinging the lever upward or backward the trailing wheel 9 may be arranged to extend more or less closely to the rear ends of the side bars and thereby adjust the frame to the grade of the ground being harrowed so that the said frame may be maintained in a horizontal position.

Secured rigidly to the axle or driving shaft 1, at the sides of the bars 3, are sprocket wheels 12 and 13 which are connected by sprocket chains 14 with similar sprocket pinions 15 and 16 carried by shafts which are journaled in the bearings or brackets 5 and 6 on the cross bar 4 and provided at their inner ends with spur gears 17 and 18 meshing respectively with the upper and lower teeth of a double crown wheel 19 having an elongated hub 20 which is swiveled in the cross bar 4 as clearly shown. This hub 20 has an angular bore in which is slidably engaged the angular upper end 21 of the harrow carrying shaft 22 which is provided near its lower end with an annular groove 23 in which is fitted a supporting block or swivel 24. This construction and arrangement of the double gear 19 and the shaft 21 permits the shaft to rise and fall through the hub without becoming disengaged therefrom so that the harrow may ride over inequalities in the surface of the ground without stopping its rotation in order that the entire surface of the soil will be treated.

In order to relieve the strain on the shaft 21 and to prevent the bending or twisting of the same as it rises and falls, I provide a bearing or guide 25 which is arranged between the side bars 3 and is provided with a central vertical opening to receive the said shaft and is also provided with a horizontal passage 26 in which the axle or driving shaft is journaled, recesses or grooves 27 being formed in the outer side of this bearing or guide to receive the guide rods 28 rising from the opposite sides of the block 24 so that twisting of the said block will be prevented. Springs 29 are coiled around the guide rods 28 between the block 24 and the bracket 25 to bear upon the said block and, consequently, hold the harrow to the ground.

The lower end of the shaft 21 is preferably of an angular formation and a disk 30 is secured to this angular lower end and is provided with a plurality of depending harrow teeth 31 as will be understood.

The lever 32 is mounted upon the main frame and is connected by a link 33 with the block 24 so that by swinging the said lever forward or backward, the extent to which the teeth may dig into the ground may be limited and, consequently, depth of the cut regulated as desired. The lever may also be swung to one limit of its movement in order to raise the harrow teeth clear of the ground when it is desired to transport the machine from one field to another field.

The draft tongue 34 is secured to a lug 35 on the front end of the bearing or bracket 25 and in order to relieve the strain on the tongue a brace rod 36 is pivoted to the front side of the block 24 and has a pin and slot connection with the tongue as clearly shown, the front end of this brace being curved so that it may readily accommodate itself to the rising and falling of the harrow carrying shaft without becoming disengaged from the tongue or shifting the angle of the same so as to increase the burden upon the draft animals.

The operation of the device will be readily understood. Draft is applied to the tongue 34 and the apparatus is drawn over the field to be treated, the carrying wheels 2 being thereby set in motion and imparting rotation directly to the axle or driving shaft. The rotation of the axle or driving shaft will be transmitted through the sprocket wheels thereon to the sprocket chains connecting the same with the sprocket pinions on the main frame. The shafts on which the said sprocket pinions are secured will, consequently, act through the spur gears on their inner ends to actuate the double crown gear 19 so that the harrow carrying shaft will be rotated and the harrow teeth swept over the soil in a circular path. The harrow teeth will thus be caused to act upon the entire surface of the field as the apparatus advances. The harrow carrying shaft will move easily in a vertical plane so that the harrow will readily follow an uneven surface and the peculiar connection of the tongue supporting brace with the tongue, hereinbefore described, will maintain the tongue in a horizontal position without interfering with the vertical movement of the harrow. The guide rods rising from the swivel block at the lower end of the harrow carrying shaft will prevent the said block being rotated through its frictional contact with the shaft and, consequently, the twisting of the tongue supporting brace will be prevented, inasmuch as the gear wheel will be rotated positively without causing undue strain on either side of the machine or the axle so that the rotation of the harrow teeth will be continuous and the soil will be thoroughly pulverized.

Various changes in the form, proportion and the minor details of construction may be resorted to without departing from the principle or sacrificing any of the advantages of this invention as defined in the appended claims.

Having thus described the invention, what I claim is:—

1. In a rotary-harrow, the combination of a main frame, a vertical harrow carrying shaft slidably mounted therein, a harrow disk carried by the lower end of said shaft, means for rotating the said shaft, a bracket mounted within the main frame and forming a guide for the shaft, a block swiveled on the shaft below the said bracket, guide rods rising from the said block and engaging the said bracket, a draft tongue attached to the front side of the said bracket, and a brace rod secured to the said block having a loose connection with the draft tongue.

2. In a rotary harrow, the combination of a main frame, an axle journaled therein, a bearing bracket within the main frame, a harrow-carrying shaft mounted vertically in the said bracket of the main frame, connections between the axle and the said shaft to rotate said shaft, a swivel block on the lower end of the harrow-carrying shaft, guide rods rising from the said block and playing in the said bracket, and springs coiled around the said guide rods between the bracket and the said block.

3. In a rotary harrow, the combination of a main frame, an axle journaled therein, bearings on the upper side of the main frame, horizontal shafts mounted in the said bearings and provided with spur gears on their inner ends, connections between the axle and the said shafts, a double crown wheel meshing with the said spur gears and having a hub swiveled in the main frame and provided with an angular bore, a harrow-carrying shaft having an angular upper end fitting in the said bore, a bracket within the main frame, a swivel block on the lower end of the harrow-carrying shaft, and guide rods rising from the said swivel block and playing through the said bracket.

4. In a rotary harrow, the combination of a main frame, an axle mounted therein, a bracket within the main frame having a bearing for the axle and provided in its opposite sides with recesses, a harrow-carrying shaft passing vertically through the said bracket, gearing between the harrow-carrying shaft and the axle, a block swiveled on the lower end of the harrow-carrying shaft, guide rods rising from the said block and playing through the recesses in the opposite ends of the said bracket, and springs coiled
5 around the said guide rods between the bracket and the said block.

In testimony whereof I have hereunto set my hand in presence of two subscribing witnesses.

THOMAS RICHARDS.

Witnesses:
H. C. FORD,
CLYDE WILSON.

Copies of this patent may be obtained for five cents each, by addressing the "Commissioner of Patents, Washington, D. C."